(12) United States Patent
Morii et al.

(10) Patent No.: US 9,806,653 B2
(45) Date of Patent: Oct. 31, 2017

(54) CONTROL APPARATUS FOR MOTOR CONTROL SYSTEM

(71) Applicant: DENSO CORPORATION, Kariya, Aichi-pref. (JP)

(72) Inventors: Akiyoshi Morii, Kariya (JP); Tetsuya Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 36 days.

(21) Appl. No.: 15/097,753

(22) Filed: Apr. 13, 2016

(65) Prior Publication Data

US 2016/0308475 A1    Oct. 20, 2016

(30) Foreign Application Priority Data

Apr. 15, 2015  (JP) .................................. 2015-083264

(51) Int. Cl.
*H02P 6/04* (2016.01)
*H02P 21/02* (2006.01)
*H02P 27/08* (2006.01)

(52) U.S. Cl.
CPC ............ *H02P 21/02* (2013.01); *H02P 27/085* (2013.01)

(58) Field of Classification Search
CPC .................... H02P 6/04; H02P 6/08
USPC ..................................... 318/51, 34
See application file for complete search history.

(56) References Cited

U.S. PATENT DOCUMENTS 5,565,752 A * 10/1996 Jansen ................ H02K 17/165
                                                    310/169
2007/0278986 A1   12/2007 Okamura
2014/0159622 A1    6/2014 Morii et al.

FOREIGN PATENT DOCUMENTS

JP        2007-325351 A    12/2007
JP           4635703 B2     2/2011
JP        2014-117117 A     6/2014

* cited by examiner

*Primary Examiner* — David S Luo
(74) *Attorney, Agent, or Firm* — Oliff PLC

(57) ABSTRACT

A control apparatus calculates a total loss change amount that is a power loss change amount of a motor control system including respective power loss change amounts of a converter, an inverter, and a motor of the motor control system. Based on the total loss change amount, during a correction-allowed period that is a period during which square wave control is performed, the control apparatus performs correction to decrease a current output voltage command value of the converter when the current output voltage command value is determined to be greater than the output voltage of the converter at which actual total power loss change amount becomes minimum. When the current output voltage command value is determined to be less than the output voltage of the converter at which actual total power loss change amount becomes minimum, the control apparatus performs correction to increase the current output voltage command value.

14 Claims, 12 Drawing Sheets

US 9,806,653 B2

CONTROL APPARATUS FOR MOTOR CONTROL SYSTEM

CROSS-REFERENCE TO RELATED APPLICATION

This application is based on and claims the benefit of priority from Japanese Patent Application No. 2015-083264, filed Apr. 15, 2015. The entire disclosure of the above application is incorporated herein by reference.

BACKGROUND

Technical Field

The present disclosure relates to a control apparatus that is applicable to a motor control system. The motor control system includes a converter, an inverter, and a motor. The converter is capable of stepping up an output voltage of a direct-current power supply and outputting the stepped-up output voltage. The inverter is capable of converting the output voltage from the converter to an alternating-current voltage and outputting the alternating-current voltage. The motor is capable of being driven by the alternating-current voltage outputted from the inverter.

Related Art

As can be seen in Japanese Patent Publication No. 4635703, as this type of control apparatus, a control apparatus that sets an output voltage command value of a converter so as to reduce the total power loss of a motor control system is known. Specifically, the control apparatus holds a target value of a modulation factor as map data, in advance. The modulation factor is that at which the total power loss of the motor control system becomes minimum. The modulation factor is associated with an inter-wire voltage magnitude and a torque command value of the motor. The control apparatus sets the output voltage command value of the converter to control the actual modulation factor to the target value of the modulation factor calculated from the map data. As a result, the total power loss of the motor control system is reduced.

Here, the inventors of the invention in the present application have found that the minimum value of total power loss of the motor control system is not determined only by the modulation factor. Therefore, a plurality of parameters related to the operating state of the motor control system are required to ascertain an operation point of the motor control system at which the total power loss becomes minimum. Thus, for example, a method using map data that associates the plurality of parameters with the output voltage command value of the converter may be used as the method for setting the output voltage command value. However, in this case, there is concern that the number of steps involved in map data generation will increase, and the number of steps involved in designing of the control apparatus will increase.

Furthermore, the operation point of the motor control system at which the total power loss becomes minimum may change depending on individual differences among mass-produced motor control systems and the temperature of the usage environment of the motor control system. Therefore, the map data may be generated such as to take into consideration the effects of individual differences and usage environment temperature, to improve ascertainment accuracy regarding the operation point at which the total power loss becomes minimum. However, in this case, there is concern that the number of steps involved in designing of the control apparatus will increase.

In this way, there is still room for improvement in the techniques for setting the output voltage command value of the converter to reduce the total power loss of the motor control system.

SUMMARY

It is thus desired to provide a control apparatus for a motor control system that is capable of accurately reducing total power loss of a motor control system, even in cases in which individual differences among motor control systems and changes in usage environment temperature of the motor control system are present.

An exemplary embodiment provides a control apparatus for a motor control system. The motor control system includes: a converter that steps up an output voltage of a direct-current power supply and outputting the stepped-up output voltage; an inverter having a serially connected member composed of an upper-arm switch and a lower-arm switch and converts the output voltage of the converter to an alternating-current voltage; and a motor driven by the alternating-current voltage outputted from the inverter.

The control apparatus includes:

(i) a command value setting unit that sets an output voltage command value of the converter; a converter control unit that controls the converter such that the output voltage of the converter is the output voltage command value set by the command value setting unit;

(ii) an inverter control unit that selects and performs pulse width modulation control when a modulation factor of the output voltage of the inverter is less than a prescribed value, and selects and performs square wave control when the modulation factor is the prescribed value or greater, the pulse width modulation control controlling the inverter such that each phase voltage applied from the inverter to the motor is a pulse width modulation waveform voltage based on the output voltage of the converter, the square wave control controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor;

(iii) a change amount calculating unit that calculates a total loss change amount that is a power loss change amount of the motor control system including respective power loss change amounts of the converter, the inverter, and the motor assuming that a current output voltage command value is changed by a predetermined value; and (iv) a correcting unit that performs a process for performing correction to decrease the current output voltage command value when the current output voltage command value is determined to be greater than the output voltage of the converter at which actual total power loss change amount becomes minimum, based on the total loss change amount calculated by the change amount calculating unit, during a correction-allowed period that is a period during which the square wave control is performed, and performs a process for performing correction to increase the current output voltage command value when the current output voltage command value is determined to be less than the output voltage of the converter at which total power loss change amount becomes minimum, based on the total loss change amount calculated by the change amount calculating unit, during the correction-allowed period.

The output voltage of the converter in relation to an applied voltage required for driving the motor becomes lower as the modulation factor increases. When the output voltage of the converter is low, the respective power losses in the converter and the inverter decrease compared to when the output voltage is high. Therefore, when the modulation factor is large, the respective power losses in the converter and the inverter decrease compared to when the modulation factor is small. As a result, when the modulation factor is greater than the prescribed value and the square wave control is being performed, the power loss in the inverter decreases compared to when the pulse width modulation control is being performed.

In addition, when the modulation factor is greater than the prescribed value and the square wave control is being performed, a weak field current flows to the motor. Therefore, when the square wave control is being performed, power loss in the motor increases compared to when the modulation factor is less than the prescribed value and the pulse width modulation control is being performed.

Here, it is found that the total power loss of the motor control system including the respective power losses in the converter, the inverter, and the motor becomes minimum when the square wave control is being performed, based on the above-described relationship between the respective power losses in the converter, the inverter, and the motor, and the modulation factor. Therefore, when the square wave control is being performed, the total power loss can be reduced by determination of the output voltage command value of the converter at which the total power loss of the motor control system can become closer to the minimum value thereof.

Therefore, in the present exemplary embodiment, the change amount calculating unit calculates the total loss change amount of the motor control system assuming that the current output voltage command value of the converter is changed by a predetermined value. The total loss change amount refers to the amount of change in power loss of the motor control system including the respective power loss change amounts of the converter, the inverter, and the motor.

In the present exemplary embodiment, the period over which the square wave control is being performed is a correction-allowed period. During the correction-allowed period, when the current output voltage command value of the converter is determined to be greater than the output voltage at which the actual total loss change amount becomes minimum based on the total loss change amount calculated by the change amount calculating unit, the current output voltage command value is corrected so as to be decreased. Meanwhile, during the correction-allowed period, when the current output voltage command value is determined to be less than the output voltage at which the actual total loss change amount becomes minimum based on the total loss change amount calculated by the change amount calculating unit, the current output voltage command value is corrected so as to be increased.

As a result of the above-described decreasing correction or increasing correction, the current output voltage command value is updated such that the total power loss of the motor control system becomes closer to the minimum value thereof, during the correction-allowed period. Here, in the preset exemplary embodiment, the method for correcting the output voltage command value by the above-described decreasing correction or increasing correction is used. Therefore, the operation point of the motor control system at which the total power loss of the motor control system becomes minimum is not required to be ascertained in advance. Consequently, the total power loss of the motor control system can be accurately reduced even when individual differences among motor control systems or changes in the usage environment temperature of the motor control system are present.

In addition, in the present exemplary embodiment, even when individual differences among mass-produced motor control systems are present, the output voltage command value is corrected with focus on the power loss change amount assuming that the output voltage command value is changed by a predetermined value. Therefore, the effects that individual differences have on correction of the output voltage command value can be suppressed.

Here, the present exemplary embodiment may be actualized in the following manner. Specifically, the motor control system may include a plurality of sets of the inverter and the motor. The converter outputs a voltage to each of the plurality of inverters. The change amount calculating unit calculates a total value of the respective power loss change amounts of the plurality of inverters and motors as the respective power loss change amounts of the inverter and the motor used to calculate the total loss change amount. The correction-allowed period is the period over which the square wave control is performed in at least one of the plurality of inverters.

When the motor control system includes a plurality of sets of the inverter and the motor, the output voltage command value at which the total value of the respective power losses in the inverter and the motor becomes minimum may differ among the sets. A reason for this is that, for example, individual differences are present among mass-produced motor control systems, and the temperatures of the motors may differ. Therefore, in the motor control system that includes a plurality of sets of the inverter and the motor, there is concern that the number of steps involved in ascertaining in advance the operation point at which the total power loss of the system becomes minimum will become large.

Therefore, the change amount calculating unit calculates the total loss change amount of the motor control system assuming that the current output voltage command value of the converter is changed by the predetermined value. The correction-allowed period is the period over which the square wave control is performed in at least one of the plurality of inverters. As a result of the decreasing correction or increasing correction, the current output voltage command value is corrected such that the total power loss of the motor control system including the power losses in the inverters and the motors becomes closer to the minimum value thereof, during the correction-allowed period. The advantages of using the above-described method for correcting the output voltage command value are significant in a motor control system that includes a plurality of sets of inverters and motors, and is a system in which, when the operation point of the motor control system at which the total power loss becomes minimum is ascertained in advance, the number of steps involved becomes large.

DESCRIPTION OF THE EMBODIMENTS

An embodiment in which a control apparatus of the present disclosure is applied to a vehicle (such as an electric car or a hybrid car) that includes a three-phase motor as an on-board main machine will hereinafter be described with reference to the drawings.

Figure 1:
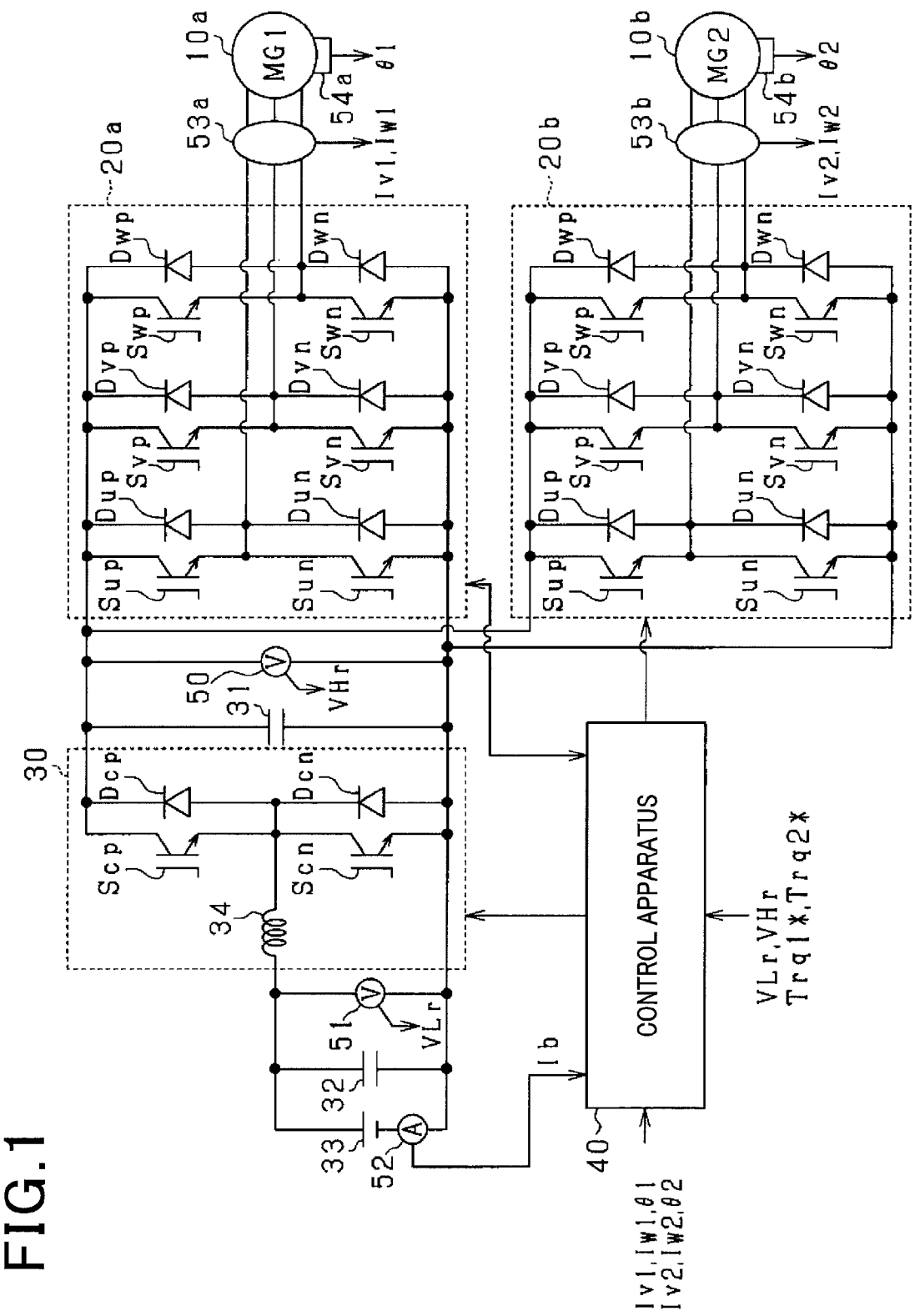
FIG. 1 is an overall configuration diagram of a motor control system according to an embodiment.

As shown in FIG. 1, a motor control system includes a first motor generator 10a, a first inverter 20a, a second motor generator 10b, a second inverter 20b, a step-up converter 30, and a control apparatus 40. According to the present embodiment, permanent magnet synchronous motors are used as the motor generators 10a and 10b. More specifically, interior permanent magnet synchronous motors (IPMSMs) that are salient pole motors are used. The first motor generator 10a serves as a power generator. The first motor generator 10a also serves as a starter that applies initial rotation to a crank shaft of a main on-board engine (not shown). The second motor generator 10b serves as an on-board main machine or the like.

The first inverter 20a is electrically connected to the first motor generator 10a. The first inverter 20a is provided with three serially connected members composed of upper-arm switches Sup, Svp, and Swp, and lower-arm switches Sun, Svn, and Swn. A U-phase of the first motor generator 10a is connected to a connection point between the U-phase upper- and lower-arm switches Sup and Sun. A V-phase of the first motor generator 10a is connected to a connection point between the V-phase upper- and lower-arm switches Svp and Svn. A W-phase of the first motor generator 10a is connected to a connection point between the W-phase upper- and lower-arm switches Swp and Swn. According to the present embodiment, voltage-control type semiconductor switching elements are used as the switches Sup to Swn. Specifically, insulated-gate bipolar transistors (IGBTs) are used. Freewheeling diodes Dup, Dvp, Dwp, Dun, Dvn, and Dwn are respectively connected in anti-parallel to the switches Sup, Svp, Swp, Sun, Svn, and Swn.

The second inverter 20b is electrically connected to the second motor generator 10b. According to the present embodiment, the configuration of the second inverter 20b is similar to that of the first inverter 20a. Therefore, according to the present embodiment, a detailed description of the second inverter 20b is omitted. In addition, for convenience, the switches and freewheeling diodes configuring the second inverter 20b are given the same reference numbers as the switches and freewheeling diodes configuring the first inverter 20a.

A common first capacitor 31 is connected in parallel to the serially connected members composed of the upper-arm switches and the lower-arm switches configuring the first inverter 20a and the second inverter 20b. A second capacitor 32 is connected to the first capacitor 31 with the step-up converter 30 therebetween. A battery 33 that is a direct-current power supply is connected to the second capacitor 32.

The step-up converter 30 includes a reactor 34 and a serially connected member composed of upper- and lower-arm step-up switches Scp and Scn. The step-up converter 30 provides a function for stepping up the inter-terminal voltage of the battery 33 with a predetermined voltage (such as 650 V) as an upper limit, by turning on/off the step-up switches Scp and Scn. According to the present embodiment, voltage-control type semiconductor switching elements are used as the step-up switches Scp and Scn. Specifically, IGBTs are used. Freewheeling diodes Dcp and Dcn are respectively connected in anti-parallel to the step-up switches Scp and Scn.

The control system is provided with a first voltage sensor 50, a second voltage sensor 51, a battery current sensor 52, a first phase current sensor 53a, a second phase current sensor 53b, a first angle sensor 54a, and a second angle sensor 54b. The first voltage sensor 50 is a first voltage detecting means for detecting an inter-terminal voltage of the first capacitor 31 as a system voltage VHr. The second voltage sensor 42 is a second voltage detecting means for detecting an inter-terminal voltage of the second capacitor 32 as a battery voltage VLr. The battery current sensor 52 is a battery current detecting means for detecting a current flowing to the battery 33.

The first phase current sensor 53a is a first phase current detecting means for detecting at least two phase currents, among the phase currents (currents on a three-phase fixed coordinate system) flowing to the first motor generator 10a. According to the present embodiment, the first phase current sensor 53a detects V- and W-phase currents. The second phase current sensor 53b is a second phase current detecting means for detecting at least two phase currents, among the phase currents flowing to the second motor generator 10b. According to the present embodiment, the second phase current sensor 53b detects V- and W-phase currents.

The first angle sensor 54a is a first angle detecting means for detecting a rotation angle (electrical angle) of the first motor generator 10a. The second angle sensor 54b is a second angle detecting means for detecting a rotation angle (electrical angle) of the second motor generator 10b.

A detection value of each sensor is inputted to the control apparatus 40. The control apparatus controls the step-up converter 30 and the first and second inverters 20a and 20b so as to control controlled variables (torque, according to the present embodiment) of the first and second motor generators 10a and 10b to command values thereof (hereafter, first and second torque command values Trq1* and Trq2*). According to the present embodiment, the control apparatus 40 includes a converter control unit and an inverter control unit.

A method for controlling the step-up converter 30 will be described. The control apparatus 40 sets an output voltage command value (hereafter, voltage command value VH*) of the step-up converter 30. The control apparatus 40 alternately turns on the step-up switches Scp and Scn so as to control the system voltage VHr to the voltage command value VH*, based on the system voltage VHr detected by the first voltage sensor 50, the battery voltage VLr detected by the second voltage sensor 51, and the voltage command value VH*. Here, duty ratio Ton/Tsw, which is a ratio of on period Ton of the lower-arm step-up switch Scn in relation to a single switching cycle Tsw, increases as step-up ratio VHr/VLr increases. Here, when the step-up ratio is 1, the lower-arm step-up switch is turned off at all times.

Figure 2:
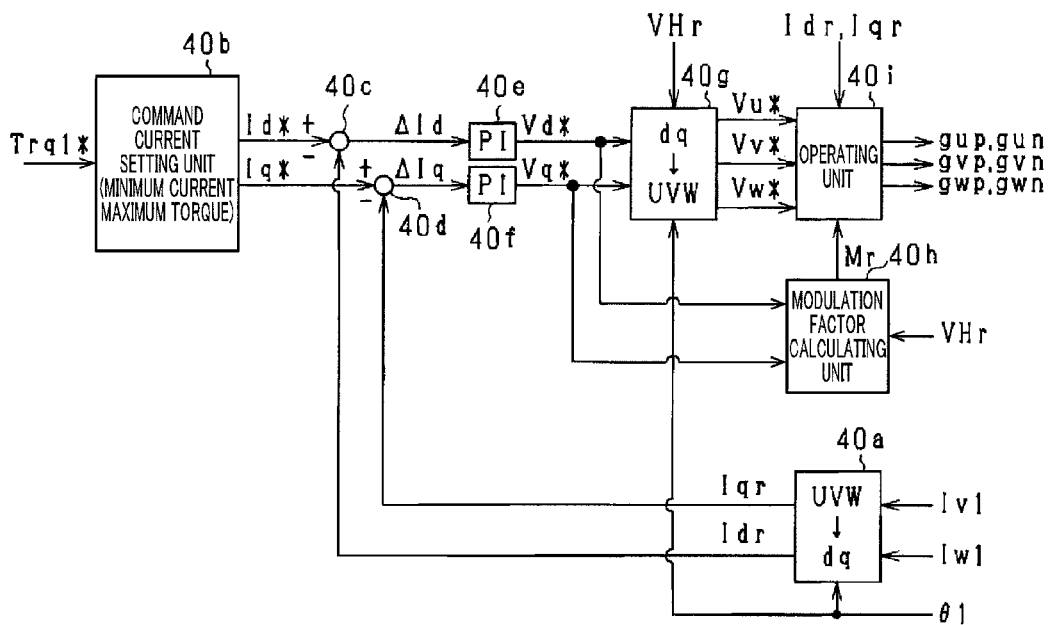
FIG. 2 is a block diagram of a motor control process.

Next, a method for controlling the first and second inverters 20a and 20b will be described with reference to FIG. 2. According to the present embodiment, the method for controlling the first inverter 20a and the method for controlling the second inverter 20b are the same. Therefore, in FIG. 2, the first inverter 20a will be described as an example. A two-phase converting unit 40a converts a U-phase current Iu1, a V-phase current Iv1, and a W-phase current Iw1 on the three-phase fixed coordinate system to a d-axis current Idr and a q-axis current Iqr on a two-phase rotation coordinate system (d-q coordinate system), based on V- and W-phase currents Iv1 and Iw1 detected by the first phase current sensor 53a and an electrical angle θ1 detected by the first angle sensor 54a.

A command current setting unit 40b sets d- and q-axis command currents Id* and Iq* based on the first torque command value Trq1*. According to the present embodiment, currents for actualizing minimum current and maximum torque control are set as the d- and q-axis command currents Id* and Iq*.

A d-axis deviation calculating unit 40c calculates a d-axis current deviation ΔId as a value obtained by subtracting the d-axis current Idr from the d-axis command current Id* set by the command current setting unit 40b. A q-axis deviation calculating unit 40d calculates a q-axis current deviation ΔIq as a value obtained by subtracting the q-axis current Iqr from the q-axis command current Iq* set by the command current setting unit 40b.

A d-axis command voltage calculating unit 40e calculates a d-axis command voltage Vd* as a manipulated value for performing feedback control of the d-axis current Idr to the d-axis command current Id* based on the d-axis current deviation ΔId. Specifically, the d-axis command voltage calculating unit 40e calculates the d-axis command voltage Vd* by proportional-plus-integral control in which the d-axis current deviation ΔId serves as the input. A q-axis command voltage calculating unit 40f calculates a q-axis command voltage Vq* as a manipulated value for performing feedback control of the q-axis current Iqr to the q-axis command current Iq* based on the q-axis current deviation ΔIq. Specifically, the q-axis command voltage calculating unit 40f calculates the q-axis command voltage Vq* by proportional-plus-integral control in which the q-axis current deviation ΔIq serves as the input.

A three-phase converting unit 40g converts the d- and q-axis command voltages Vd* and Vq* on the d-q coordinate system to U-, V-, and W-phase command voltages Vu*, Vv*, and Vw* on the three-phase fixed coordinate system based on the d- and q-axis command voltages Vd* and Vq*, the system voltage VHr, and the electrical angle θ1. According to the present embodiment, the U-, V-, and W-phase command voltages Vu*, Vv*, and Vw* are waveforms of which the respective phases are shifted from each other by 120° in terms of electrical angle.

A modulation factor calculating unit 40h calculates a modulation factor Mr based on the d- and q-axis command voltages Vd* and Vq*, and the system voltage VHr. According to the present embodiment, the modulation factor Mr is calculated based on the following expression (eq1).

$$Mr = \frac{\sqrt{Vd^{*2} + Vq^{*2}}}{VHr} \qquad (eq1)$$

In the above expression (eq1), the numerator on the right side expresses the magnitude of the voltage vector of the first inverter 20a.

Figure 3:
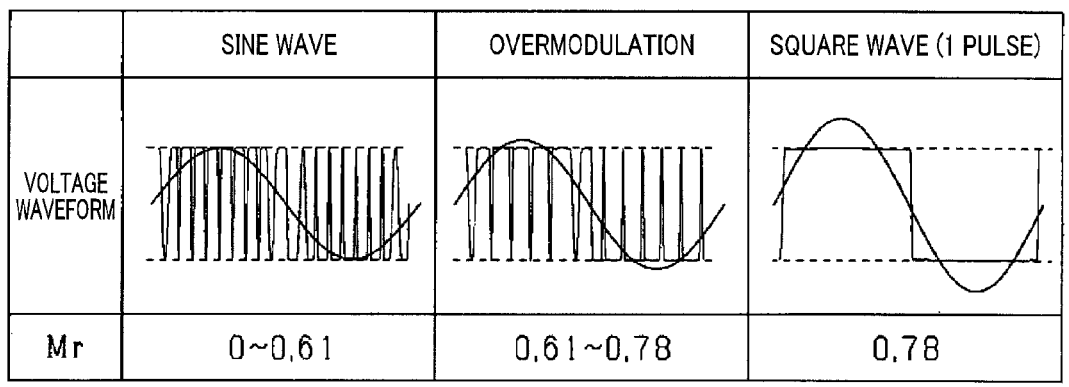
FIG. 3 is a diagram of an overview of sine wave PWM control, overmodulation control, and square wave control.

An operating unit 40i selects and performs any control among sine-wave pulse width modulation (PWM) control, overmodulation control, and square wave control, based on the modulation factor Mr. According to the present embodiment, as shown in FIG. 3, when determined that the modulation factor Mr is 0 or greater or less than a first prescribed value (0.61 according to the present embodiment), the operating unit 40i performs the sine-wave PWM control. When determined that the modulation factor Mr is the first prescribed value or greater and less than a second prescribed value (0.78 according to the present embodiment), the operating unit 40i performs the overmodulation control.

In the sine-wave PWM control, operating signals gup, gun, gyp, gvn, gwp, and gwn for turning on/off the switches Sup, Sun, Svp, Svn, Swp, and Swn are generated based on size comparison between a carrier signal (such as a triangular-wave signal) and the phase command voltages Vu*, Vv*, and Vw* outputted from the three-phase converting unit 40g. The magnitudes of the phase command voltages Vu*, Vv*, and Vw* in the sine-wave PWM control are the magnitude of the carrier signal or less.

In the overmodulation control, the operating signals gup, gun, gyp, gvn, gwp, and gwn are generated based on size comparison between the phase command voltages Vu*, Vv*, and Vw* having magnitudes greater than that of the carrier signal, and the carrier signal.

Meanwhile, when determined that the modulation factor Mr is the second prescribed value, the operating unit 40i performs the square wave control. In the square wave control, two states are actualized, once each, during a single electrical-angle cycle of the first motor generator 10a. One state is that in which the upper-arm switches Sup, Svp, and Swp are turned on and the lower-arm switches Sun, Svn, and Swn are turned off. The other state is that in which the upper-arm switches Sup, Svp, and Swp are turned off and the lower-arm switches Sun, Svn, and Swn are turned on. In the square wave control, the torque of the first motor generator 10a is controlled to the first torque command value Trq1* by the phase of the voltage vector being controlled, upon the magnitude of a basic wave component of the output voltage of the first inverter 10a being fixed. Here, the phase of the voltage vector may be calculated as a manipulated variable for performing feedback control of a torque estimation value of the first motor generator 10a to the first torque command value Trq1*. The torque estimation value may be calculated based on the d- and q-axis currents Idr and Iqr.

The operating signals generated by the operating unit 40i are outputted to the first inverter 20a. In this way, when the modulation factor Mr is less than the second prescribed value, the sine-wave PWM control or the overmodualtion control based on current feedback control is performed. Meanwhile, when the modulation factor Mr reaches the second prescribed value, the square wave control is performed.

Figure 4:
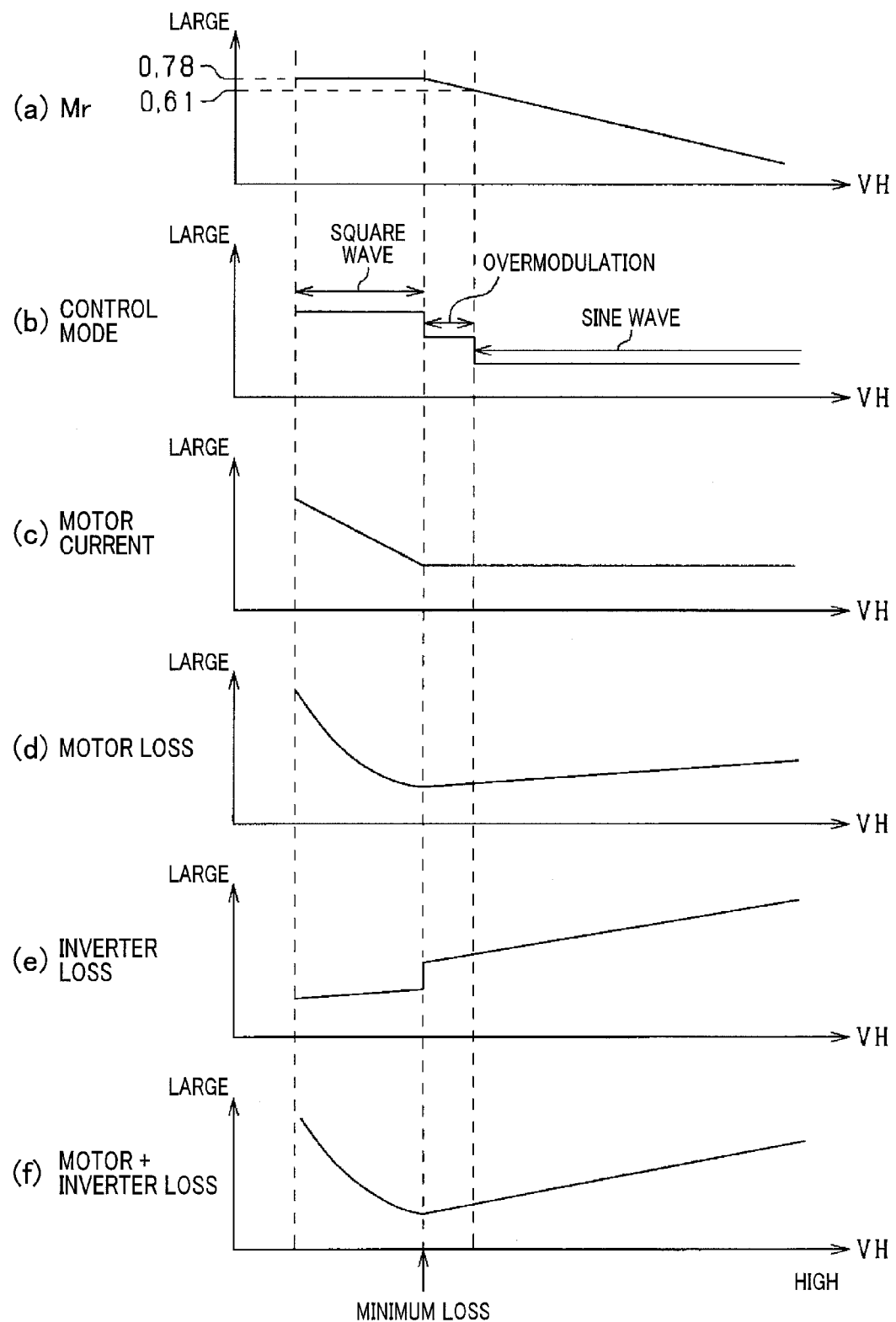
FIG. 4 is a diagram of a relationship between converter output voltage, control mode, and power loss.

FIG. 4 shows a relationship between the output voltage VH of the step-up converter 30 and each parameter in a case in which rotation speed and torque of the motor generator are fixed. In FIG. 4, for example, motor current refers to the magnitude of a current vector of a current flowing to the motor generator, on a d-q coordinate system.

As shown in (a) of FIG. 4, the modulation factor Mr increases as the output voltage VH of the step-up converter 30 decreases. When the output voltage VH decreases to a certain voltage, the modulation factor Mr is fixed at the second prescribed value (0.78). In addition, as shown in (c) of FIG. 4, when the modulation factor Mr is less than the second prescribed value, the motor current is fixed regardless of the output voltage VH of the step-up converter 30. However, when the modulation factor Mr becomes the second prescribed value, the motor current increases as the output voltage VH decreases. A reason for this is that, in the square wave control, the phase of the voltage vector is advanced and a weak field current is sent to increase torque in the motor generator. As a result, the power loss in the motor generator when the square wave control is performed is greater than the power loss in the motor generator when the sine-wave PWM control or the overmodulation control is performed. In addition, when the square wave control is performed, the power loss in the motor generator increases as the motor current increases.

Power loss in the inverter is dependent on the number of switching operations of each switch, because switching loss in the switches configuring the inverter is dominant. Therefore, as shown in (e) of FIG. 4, the power loss in the inverter is minimum in the square wave control and maximum in the sine-wave PWM control, among the square wave control, overmodulation control, and sine-wave PWM control.

As shown in (f) of FIG. 4, the total value of the respective power losses in the inverter and the motor generator, described above, is minimum at the output voltage VH of the step-up converter 30 in which control is switched from the overmodulation control to the square wave control. Here, power loss in the step-up converter 30 is also required to be considered, in addition to the respective power losses in the inverter and the motor generator. According to the present embodiment, the voltage command value VH* of the step-up converter 30 at which the total power loss of the motor control system becomes minimum is set.

Next, a process for calculating the voltage command value VH* of the step-up converter 30 will be described. The voltage command value VH* is set such that the total power loss of the motor control system becomes minimum. According to the present embodiment, the total power loss is the total value of the power losses in the first and second inverters 20a and 20b, the power losses in the first and second motor generators 10a and 10b, and the power loss in the step-up converter 30. To set the voltage command value VH* such that the total power loss becomes minimum, according to the present embodiment, a process for correcting the voltage command value VH* each time is performed during a correction-allowed period in which the square wave control is performed on at least either of the first and second inverters 20a and 20b.

Figure 5:
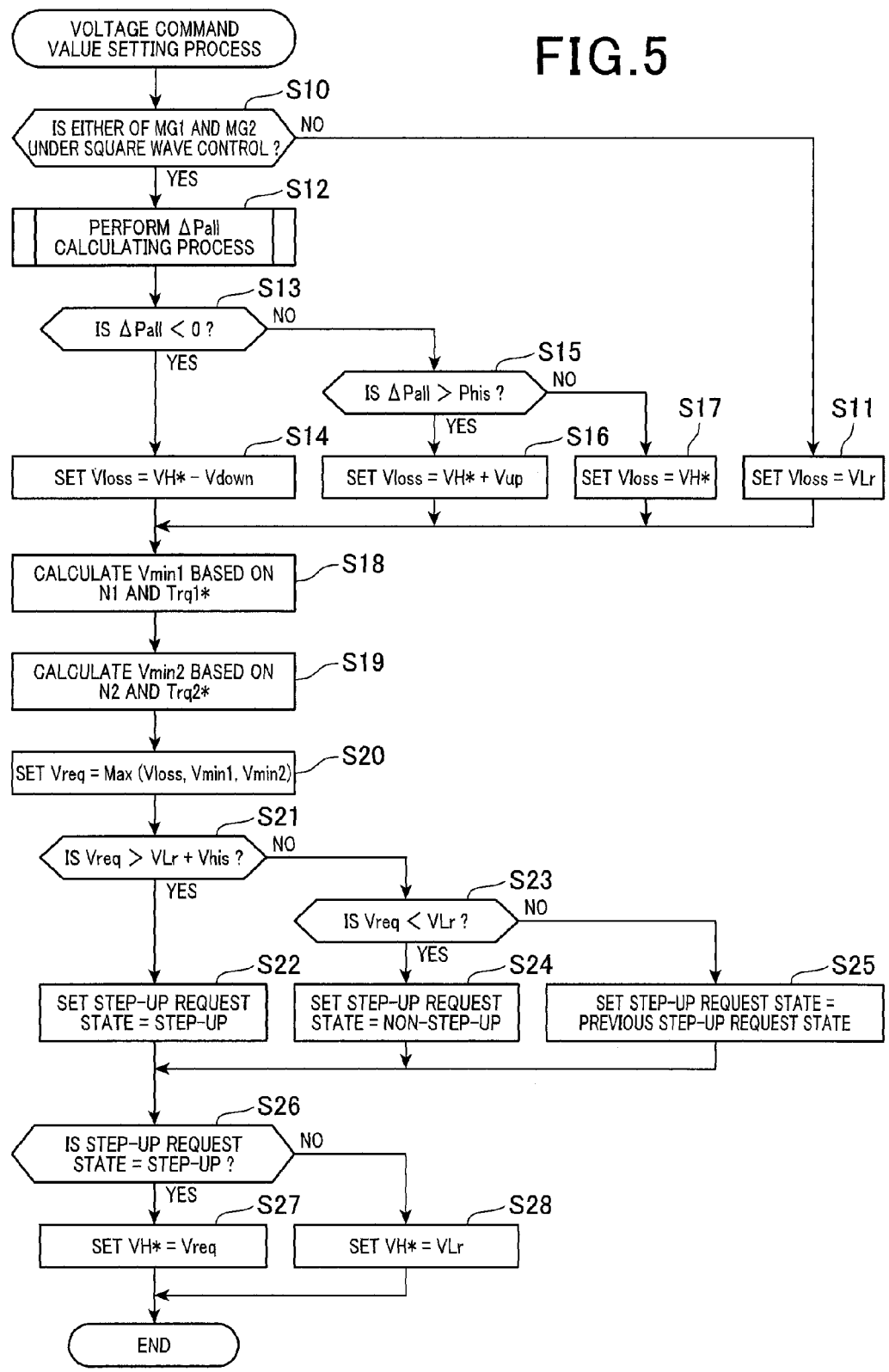
FIG. 5 is a flowchart of the steps in a voltage command value setting process.

FIG. 5 shows the steps in a voltage command value setting process including a process for correcting the voltage command value VH*. The process is repeatedly performed at a predetermined processing cycle, for example, by the control apparatus 40. According to the present embodiment, the voltage command value VH* used in the processes shown in FIG. 5 to FIG. 14 refers to the newest voltage command value VH* set at the previous processing cycle.

In this series of processes, first, at step S10, the control apparatus 40 determines whether or not at least either of the first and second motor generators 10a and 10b is being driven under the square wave control. When determined, at step S10, that neither of the first and second motor generators 10a and 10b is driven under the square wave control, the control apparatus 40 prohibits correction of the voltage command value VH* and proceeds to step S11. At step S11, the control apparatus 40 sets a minimum loss voltage Vloss, which is a hypothetical constant of the voltage command value VH*, to the battery voltage VLr.

When determined YES at step S10, the control apparatus 40 allows correction of the voltage command value VH* and proceeds to step S12. At step S12, the control apparatus 40 performs a process for calculating a total loss change amount ΔPall that is the amount of change in the total power loss of the motor control system.

Figure 6:
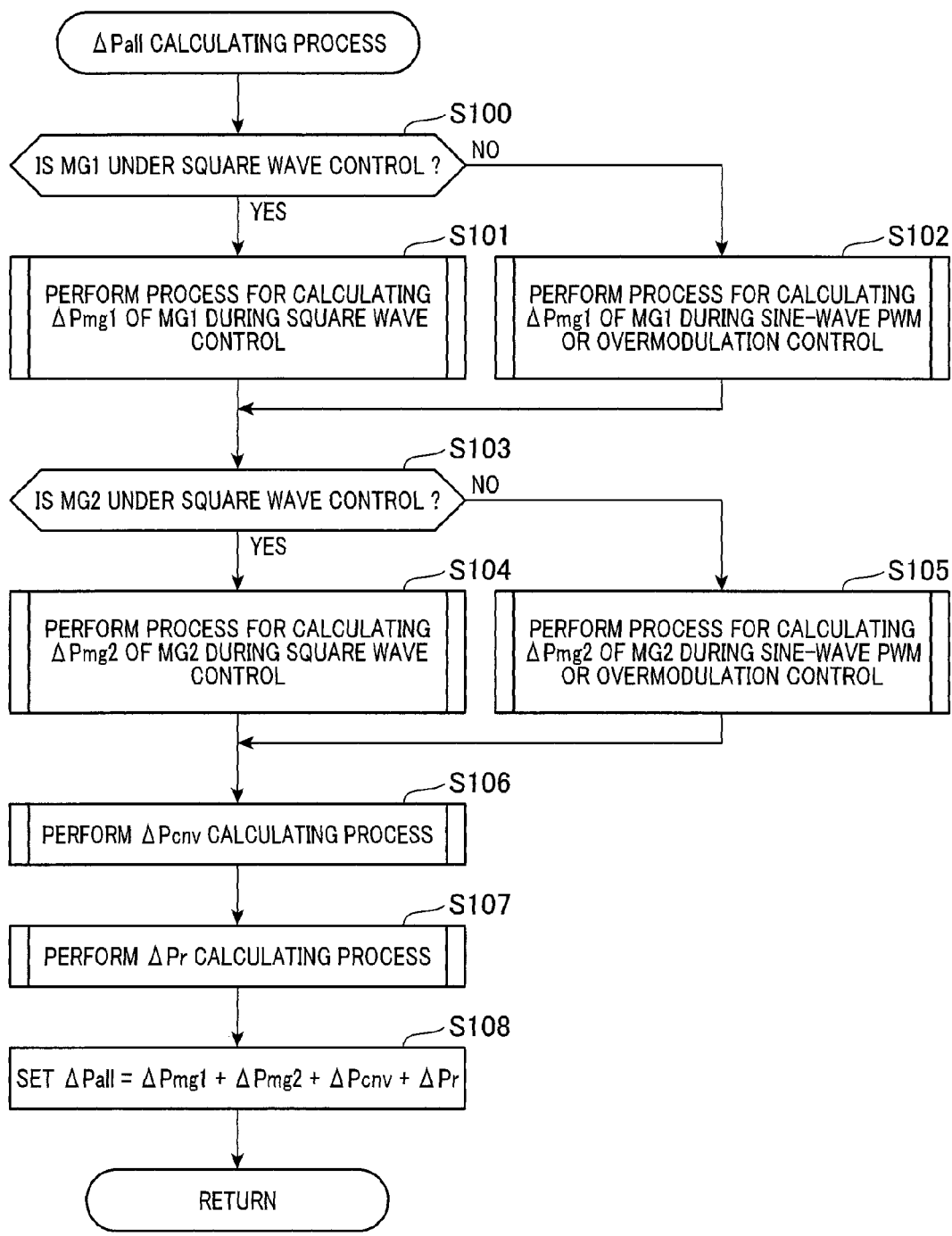
FIG. 6 is a flowchart of the steps in a process for calculating a total loss change amount.

FIG. 6 shows the steps in the process for calculating the total loss change amount ΔPall. According to the present embodiment, this process corresponds to a change amount calculating unit.

At step S100, the control apparatus 40 determines whether or not the first motor generator 10a is being driven under the square wave control. When determined YES at step S100, the control apparatus 40 proceeds to step S101. The control apparatus 40 then calculates a total value (hereafter, a first loss change amount ΔPmg1) of the respective power loss change amounts of the first motor generator 10a and the first inverter 20a when the square wave control is being performed. Meanwhile, when determined NO at step S100, the control apparatus 40 proceeds to step S102.

The control apparatus 40 then calculates the first loss change amount ΔPmg1 when the sine-wave PWM control or the overmodulation control is being performed. Hereafter, the method for calculating the first loss change amount ΔPmg1 when the square wave control is being performed will be described with reference to FIG. 7. The method for calculating the first loss change amount ΔPmg1 when the sine-wave PWM control or the overmodulation control is being performed will be described with reference to FIG. 9.

Figure 7:
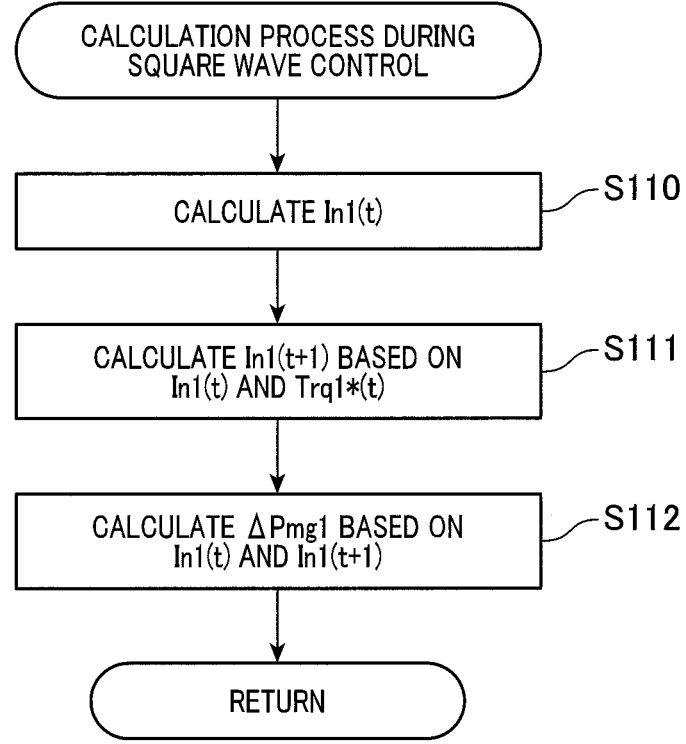
FIG. 7 is a flowchart of the steps in a process for calculating the total loss change amount of the motor and the inverter during square wave control.

First, FIG. 7 shows the steps in the process for calculating the first loss change amount ΔPmg1 when the square wave control is being performed. According to the present embodiment, as the first loss change amount ΔPmg1 when the square wave control is being performed, focus is placed only on the amount of change attributed to copper loss in the first motor generator 10a. A reason for this is that, when the square wave control is being performed, the switching frequency is low. The respective amounts of change in iron loss in the first motor generator 10a and power loss in the first inverter 20a that are dependent on the switching frequency are miniscule and can be ignored.

At step S110, the control apparatus 40 calculates a magnitude In1($t$) of the current vector of the current flowing to the first motor generator 10a during the current processing cycle, based on the d- and q-axis currents Idr and Iqr outputted from the two-phase converting unit 40a.

At subsequent step S111, the control apparatus 40 calculates a magnitude In(t+1) of the current vector during the next processing cycle assuming that the voltage command value VH* is set to a value obtained by subtracting a first correction amount Vdown (>0) from the current voltage command value VH*, based on the magnitude In1(t) during the present processing cycle and the first torque command value Trq1*.

Figure 8:
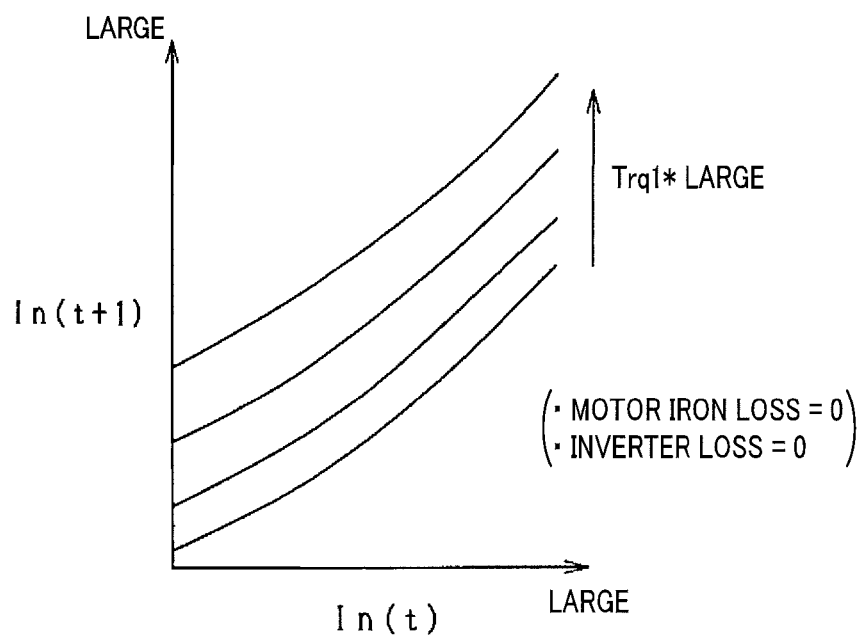
FIG. 8 is a diagram of characteristics information in which current magnitude during a current processing cycle, torque command value, and current magnitude during the next processing cycle are associated.

According to the present embodiment, as shown in FIG. 8, the magnitude In(t+1) of the current vector during the next processing cycle is calculated based on characteristics information (map data) in which the magnitude In1(t) during the present processing cycle, the first torque command value Trq1*, and the magnitude In(t+1) of the current vector during the next processing cycle are associated. Here, the magnitude In(t+1) of the current vector during the next processing cycle is calculated to be greater as the magnitude In1(t) during the present processing cycle increases or as the first torque command value Trq1* increases.

At subsequent step S112, the control apparatus 40 calculates the first loss change amount ΔPmg1 based on the magnitude In1(t) of the current vector during the present processing cycle and the magnitude In(t+1) of the current vector during the next processing cycle. According to the present embodiment, the first loss change amount ΔPmg1 is calculated based on the following expression (eq2).

$$\Delta Pmg1 = R1\left\{\left(\frac{In(t+1)}{\sqrt{2}}\right)^2 - \left(\frac{In(t)}{\sqrt{2}}\right)^2\right\} \quad (eq2)$$

In the above expression (eq2), R1 represents resistance of the three phases of the first motor generator 10a.

Figure 9:
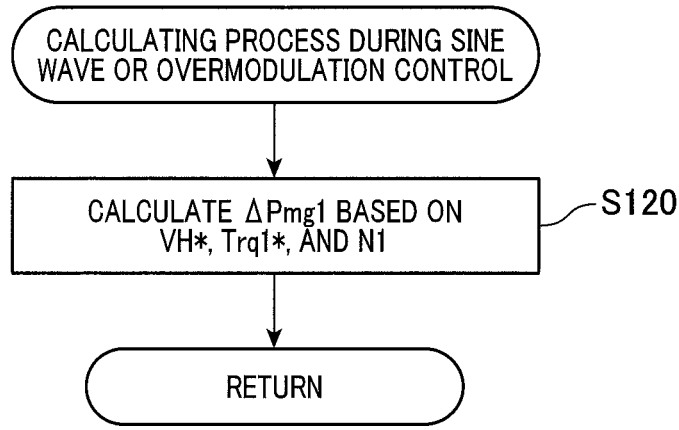
FIG. 9 is a flowchart of the steps in a process for calculating the total loss change amount of the motor and the inverter during sine wave PWM control and overmodulation control.

Next, FIG. 9 shows the steps in the process for calculating the first loss change amount ΔPmg1 when the sine-wave PWM control or the overmodulation control is being performed. According to the present embodiment, as the first loss change amount ΔPmg1 when the sine-wave PWM control or the overmodulation control is being performed, focus is placed only on the amount of change attributed to iron loss in the first motor generator 10a and power loss in the first inverter 20a. A reason for this is that, when the sine-wave PWM control or the overmodulation control is being performed, the motor current does not change even when the output voltage VH of the step-up converter 30 changes, as shown earlier in (c) of FIG. 4, and copper loss can be ignored.

Figure 10:
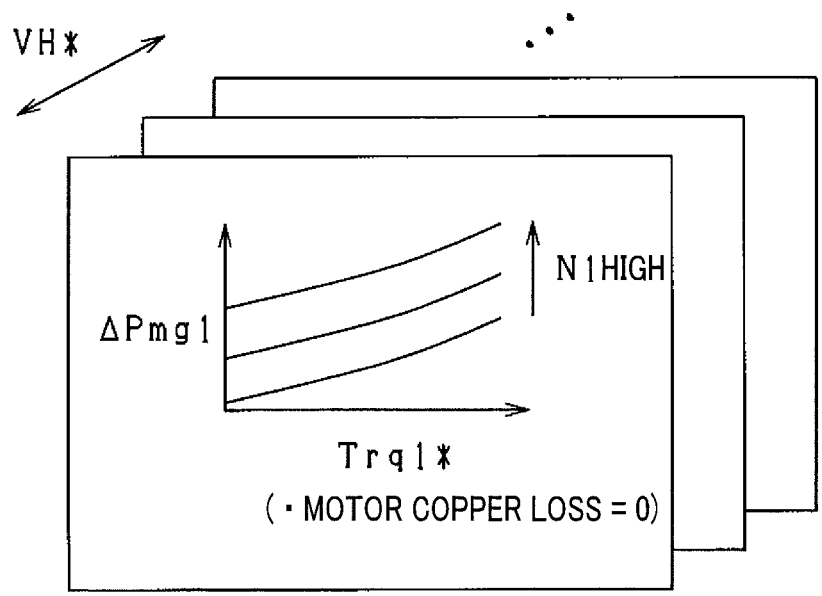
FIG. 10 is a diagram of characteristics information in which toque command value, motor rotation speed, voltage command value, and total loss change amount of the motor and the inverter are associated.

At step S120, the control apparatus 40 calculates the first loss change amount ΔPmg1 based on the voltage command value VH*, the first torque command value Trq1*, and a rotation speed N1 of the first motor generator 10a. According to the present embodiment, as shown in FIG. 10, the first loss change amount ΔPmg1 is calculated based on characteristics information (map data) in which the first torque command value Trq1*, the rotation speed N1, the voltage command value VH*, and the first loss change amount ΔPmg1 are associated. The first loss change amount ΔPmg1 is calculated to be greater as the torque command value Trq1* increases, the rotation speed N1 increases, or the voltage command value VH* increases. The rotation speed N1 may be calculated based on the electrical angle θ1 detected by the first angle sensor 54a.

Returning to the earlier description regarding FIG. 6, at subsequent step S103, the control apparatus 40 determines whether or not the second motor generator 10b is being driven under the square wave control. When determined YES at step S103, the control apparatus 40 proceeds to step S104. The control apparatus 40 then calculates a total value (hereafter, a second loss change amount ΔPmg2) of the respective power loss change amounts of the second motor generator 10b and the second inverter 20b when the square wave control is being performed. Here, the second loss change amount ΔPmg2 when the square wave control is being performed may be calculated by a process similar to the process at step S101.

Meanwhile, when determined NO at step S103, the control apparatus 40 proceeds to step S105. The control apparatus 40 then calculates the second loss change amount ΔPmg2 when the sine-wave PWM control or the overmodulation control is being performed. Here, the second loss change amount ΔPmg2 when the sine-wave PWM control or the overmodulation control is being performed may be calculated by a process similar to the process at step S102.

At subsequent steps S106 and S107, the control apparatus 40 calculates the amount of change in power loss in the step-up converter 30. According to the present embodiment, the power loss change amount of the step-up converter 30 is the total value of a converter loss change amount ΔPcnv and a reactor loss change amount ΔPr. The converter loss change amount ΔPcnv refers to the amount of change in power loss attributed to switching loss and conduction loss in the step-up switches Scp and Scn. The reactor loss change amount ΔPr refers to the amount of change in power loss attributed to current flowing to the reactor 34. Hereafter, the method for calculating the converter loss change amount ΔPcnv will be described with reference to FIG. 11. The method for calculating the reactor loss change amount ΔPr will be described with reference to FIG. 13.

Figure 11:
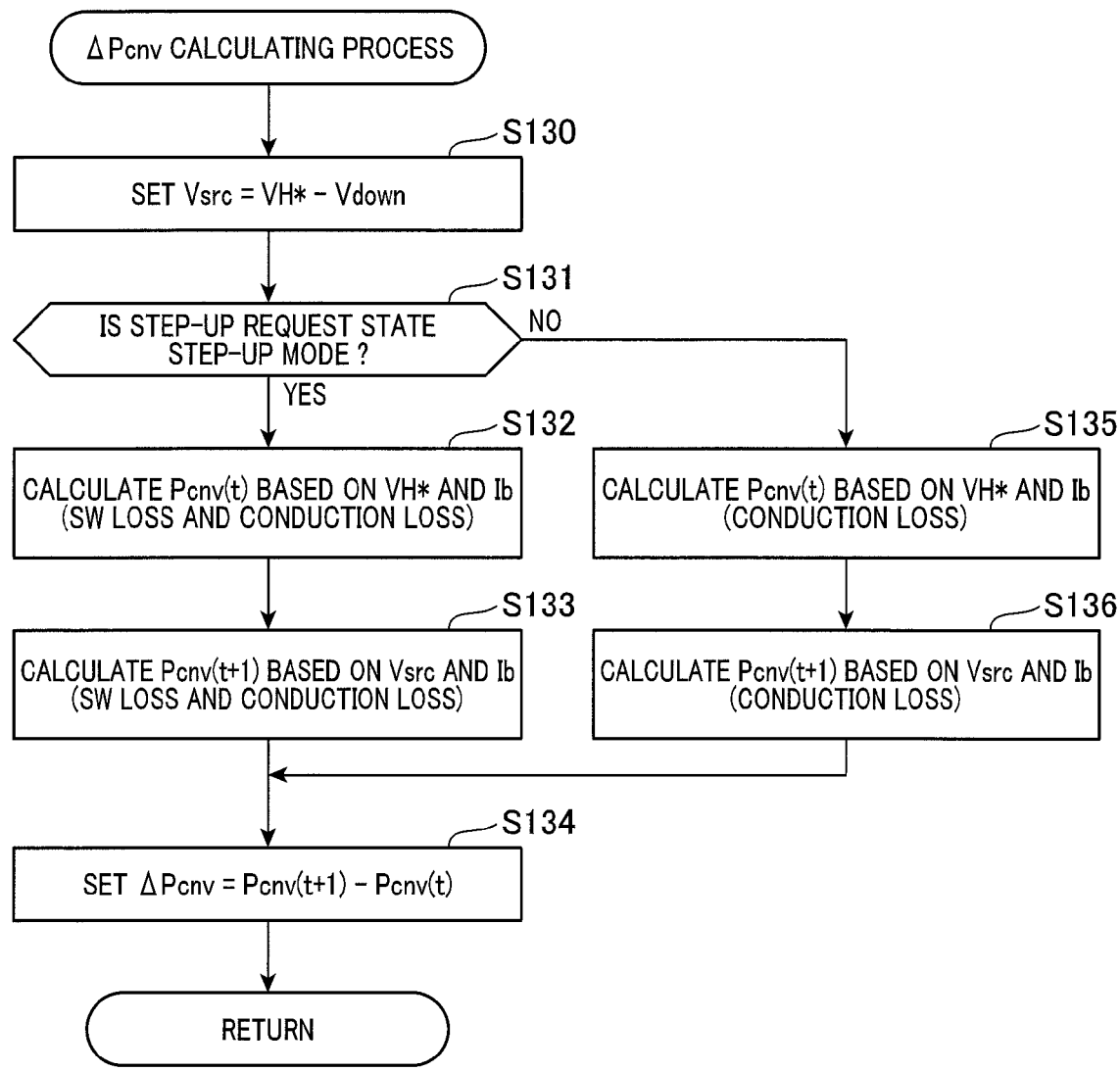
FIG. 11 is a flowchart of the steps in a process for calculating a converter loss change amount.

First, FIG. 11 shows the steps in a process for calculating the converter loss change amount ΔPcnv.

At step S130, the control apparatus 40 calculates a value obtained by subtracting the first correction value Vdown from the voltage command value VH* as a search voltage Vsrc.

At subsequent step S131, the control apparatus 40 determines whether or not a step-up request state, which is an operating state of the step-up converter 30, is step-up mode. When determined YES at step S131, the control apparatus 40 proceeds to step S132. The control apparatus 40 then calculates converter loss Pcnv(t) during the current processing cycle based on the voltage command value VH* and battery current Ib detected by the battery current sensor 52. In addition, at step S133, the control apparatus 40 calculates converter loss Pcnv(t+1) during the next processing cycle based on the search voltage Vsrc and the battery current Ib. Here, the convert loss Pcnv at step S132 and S133 is the total value of the switching loss and conduction loss in the step-up switches Scp and Scn.

Figure 12:
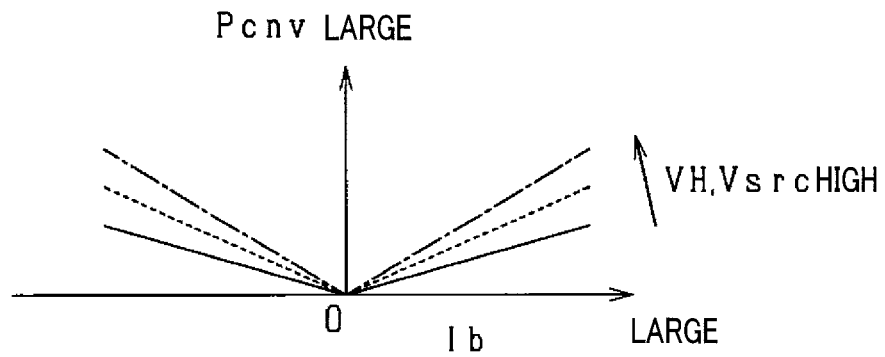
FIG. 12 is a diagram of characteristics information in which battery current, voltage command value, and converter loss change amount are associated.

According to the present embodiment, as shown in FIG. 12, the converter loss Pcnv is calculated based on characteristics information (map data) in which the battery current Ib, the voltage command value VH* or the search voltage Vsrc, and the converter loss Pcnv are associated. Here, the converter loss Pcnv is calculated to be greater as the battery current Ib increases, or the voltage command value VH* or the search voltage Vsrc increases.

Meanwhile, when determined No at step S131, the control apparatus 40 determines that the step-up request state is non-step-up mode and proceeds to step S135. At step S135, the control apparatus 40 calculates the converter loss Pcnv(t) during the current processing period based on the voltage command value VH* and the battery current Ib. In addition, at step S136, the control apparatus 40 calculates the converter loss Pcnv(t+1) during the next processing cycle based on the search voltage Vsrc and the battery current Ib. Here, the converter loss Pcnv at steps S135 and S136 is the conduction loss in the step-up switches Scp and Sen. According to the present embodiment, the converter loss Pcnv is calculated based on the characteristics information shown in FIG. 12, described earlier. According to the present embodiment, the map data used at steps S132 and S133 differ from the map data used at steps S135 and S136.

At subsequent step S134, the control apparatus 40 calculates the converter loss change amount ΔPcnv as a value obtained by subtracting the converter loss Pcnv(t) during the current processing period from the converter loss Pcnv(t+1) during the next processing period.

Figure 13:
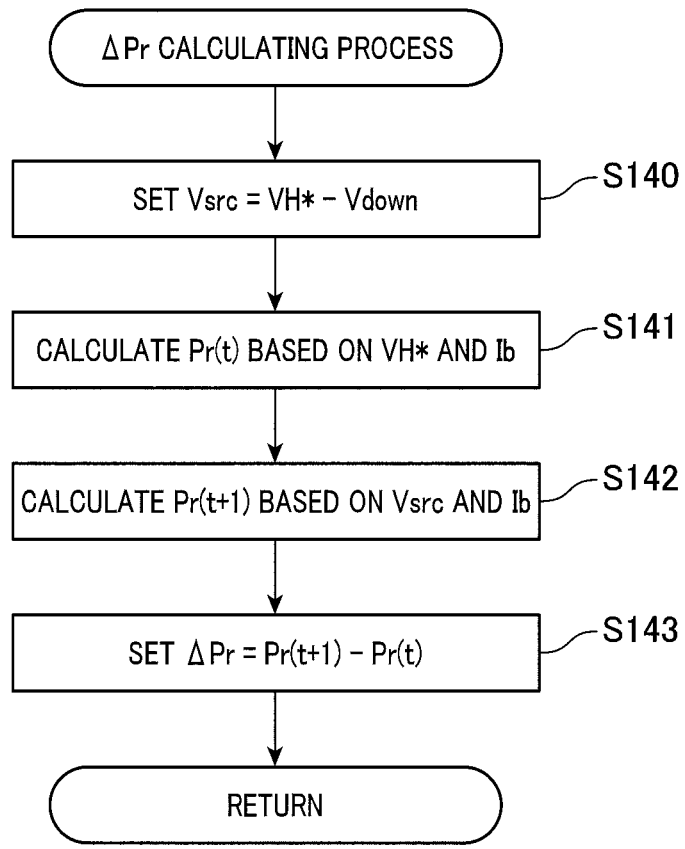
FIG. 13 is a flowchart of the steps in a process for calculating a reactor loss change amount.

Next, FIG. 13 shows a process for calculating the reactor loss change amount ΔPr.

At step S140, the control apparatus 40 calculates a value obtained by subtracting the first correction value Vdown from the voltage command value VH* as the search voltage Vsrc.

Figure 14:
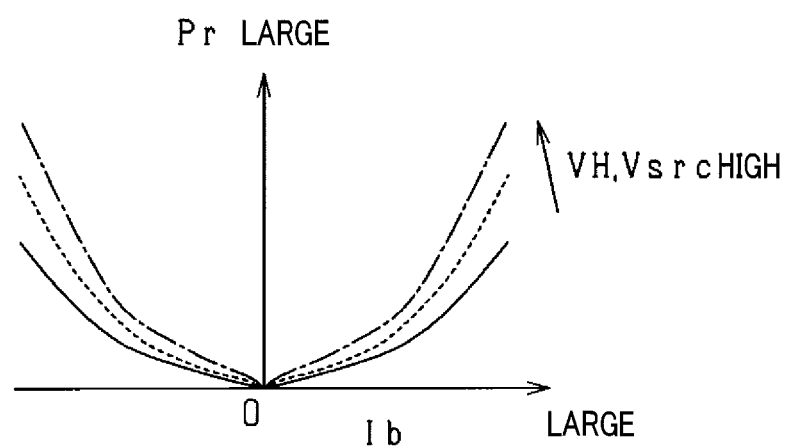
FIG. 14 is a diagram of characteristics information in which battery current, voltage command value, and reactor loss change amount are associated.

At subsequent step S141, the control apparatus 40 calculates power loss Pr(t) in the reactor 34 during the current processing cycle based on the voltage command value VH* and the battery current Ib. In addition, at step S142, the control apparatus 40 calculates power loss Pr(t+1) during the next processing cycle based on the search voltage Vsrc and the battery current Ib. According to the preset embodiment, as shown in FIG. 14, the power loss Pr in the reactor 34 is calculated based on characteristics information (map data) in which the battery current Ib, the voltage command value VH* or the search voltage Vsrc, and the power loss Pr in the reactor 34 are associated. Here, the power loss Pr in the reactor 34 is calculated to be greater as the battery current Ib increases, or the voltage command value VH* or the search voltage Vsrc increases.

At subsequent step S143, the control apparatus 40 calculates the reactor loss change amount ΔPr as a value obtained by subtracting the power loss Pr(t) during the current processing cycle from the power loss Pr(t+1) during the next processing cycle.

Returning to the earlier description regarding FIG. 6, at subsequent step S108, the control apparatus 40 calculates the total loss change amount ΔPall as an addition value of the first loss change amount ΔPmg1, the second loss change amount ΔPmg2, the converter loss change amount ΔPcnv, and the reactor loss change amount ΔPr.

Returning to the earlier description regarding FIG. 5, at subsequent step S13, the control apparatus 40 determines whether or not the total loss change amount value ΔPall calculated at step S12 is a negative value. The control apparatus 40 performs this process to determine whether or not the current voltage command value VH* is further toward the high voltage side than the voltage command value VH* at which the actual total loss change amount becomes minimum. When determined that the total loss change amount ΔPall is a negative value, the control apparatus 40 proceeds to step S14. The control apparatus sets the minimum loss voltage Vloss to a value obtained by subtracting the first correction value Vdown from the voltage command value VH*.

Meanwhile, when determined NO at step S13, the control apparatus 40 proceeds to step S15. The control apparatus 40 determines whether or not the total loss change amount value ΔPall is greater than a first threshold Phis (>0). The control apparatus 40 performs this process to determine whether or not the current voltage command value VH* is further toward the low voltage side than the voltage command value VH* at which the actual total loss change amount becomes minimum. Here, the first threshold Phis is a value for preventing alternating repetition of the increase correction at step S14 and the decrease correction at step S16 resulting from frequent zero-crossing of the total loss change amount value ΔPall.

When determined YES at step S15, the control apparatus 40 proceeds to step S16. The control apparatus 40 sets the minimum loss voltage Vloss to a value obtained by adding a second correction amount Vup (>0) to the voltage command value VH*. When determined NO at step S15, the control apparatus 40 proceeds to step S17. The control apparatus 40 maintains the minimum loss voltage Vloss at the voltage command value VH* set during the previous processing cycle.

At subsequent step S18, the control apparatus 40 calculates a first minimum voltage Vmin1 based on the rotation speed N1 and the first torque command value Trq1* of the first motor generator 10a. The first minimum voltage Vmin1 is the minimum input voltage of the first inverter 20a required for driving the first motor generator 10a.

At subsequent step S19, the control apparatus 40 calculates a second minimum voltage Vmin2 based on a rotation speed N2 and the second torque command value Trq2* of the second motor generator 10b. The second minimum voltage Vmin2 is the minimum input voltage of the second inverter 20b required for driving the second motor generator 10b. The rotation speed N2 may be calculated based on an electrical angle θ2 detected by the second angle sensor 54b.

At subsequent step S20, the control apparatus 40 sets a maximum value among the minimum loss voltage Vloss, the first minimum voltage Vmin1, and the second minimum voltage Vmin2 as a request voltage Vreq. At subsequent step S21, the control apparatus 40 determines whether or not the request voltage Vreq is greater than an addition value of the battery voltage VLr and a second threshold Vhis (>0).

When determined YES at step S21, the control apparatus 40 proceeds to step S22 and sets the step-up request state to step-up mode. Meanwhile, when determined NO at step S21, the control apparatus 40 proceeds to step S23 and determines whether or not the request voltage Vreq is less than the battery voltage VLr. When determined YES at step S23, the control apparatus 40 proceeds to step S24 and sets the step-up request state to non-step-up mode. Meanwhile, when determined NO at step S23, the control apparatus 40 proceeds to step S25 and maintains the step-up request state at the step-up request state set during the previous processing cycle.

At subsequent step S26, the control apparatus 40 determines whether or not the step-up request state is step-up mode. When determined that the step-up request state is step-up mode at step S26, the control apparatus 40 proceeds to step S27 and sets the voltage command value VH* to the request voltage Vreq. Meanwhile, when determined that the step-up request state is non-step-up mode at step S26, the control apparatus 40 proceeds to step S28 and sets the voltage command value VH* to the battery voltage VLr. That is, the step-up ratio is set to 1. As a result of the processes at steps S27 and S28, the voltage command value VH* is updated. According to the present embodiment, the processes at steps S27 and S28 correspond to a command value setting unit.

Figure 15A:
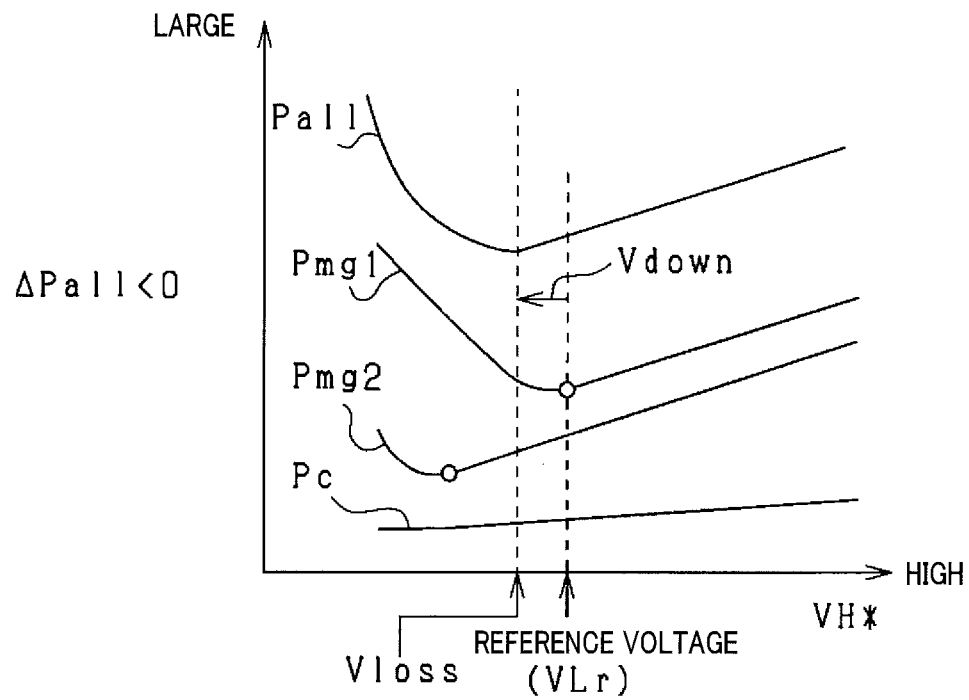
FIGS. 15A and 15B are diagrams of an overview of a method for correcting the voltage command value.
Figure 15B:
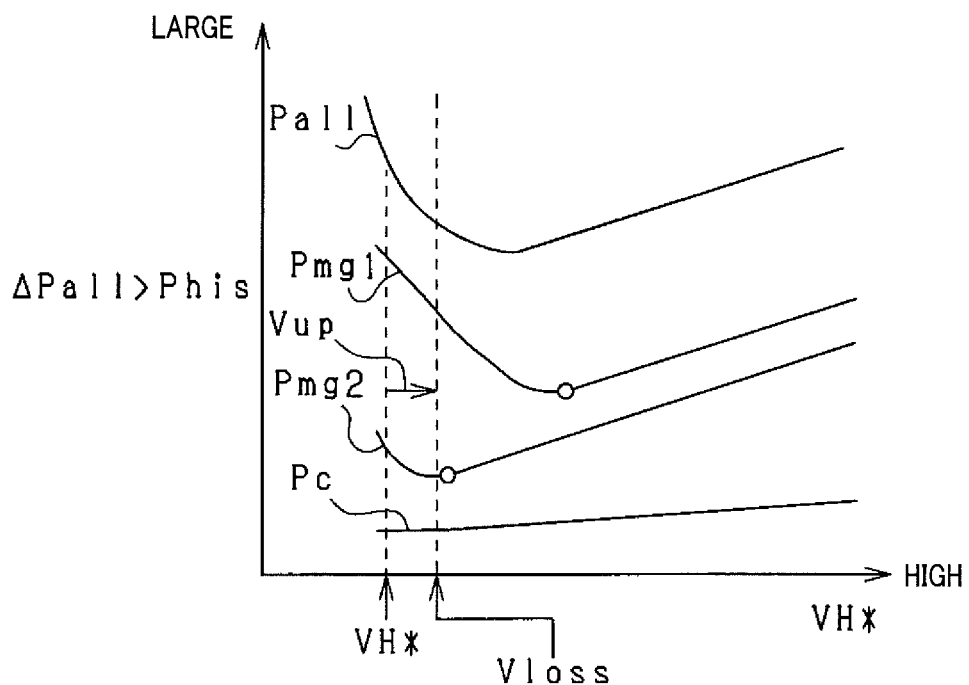

FIGS. 15A and 15B show examples of a process for correcting the voltage command value VH*. In FIGS. 15A and 15B, Pall indicates the total power loss of the motor control system. Pmg1 indicates the total value of the power losses in the first inverter 20a and the first motor generator 10a. Pmg2 indicates the total value of the power losses in the second inverter 20b and the second motor generator 10b. Pc indicates the power loss in the step-up converter 30.

The motor control system according to the present embodiment includes two sets of motor generators and inverters. The voltage command value VH* at which the Pmg1 becomes minimum and the voltage command value VH* at which the Pmg2 becomes minimum differ. Therefore, the voltage command value VH* at which the total power loss Pall becomes minimum is present in between the voltage command value VH* at which the Pmg1 becomes minimum and the voltage command value VH* at which the Pmg2 becomes minimum.

FIG. 15A is an example of the correction process when the total loss change amount ΔPall calculated at step S12 in FIG. 5 is a negative value. More specifically, FIG. 15A is an example of the correction process when the control apparatus 40 determines NO at step S10 in the previous processing cycle and subsequently determines YES at step S10 in the current processing cycle.

In FIG. 15A, the minimum loss voltage Vloss set at step S11 in the previous processing cycle is indicated as a reference voltage (VLr). Because the total loss change amount ΔPall is a negative value, the control apparatus 40 determines YES at step S13 in the current processing cycle. Therefore, the value obtained by the first correction value Vdown being subtracted from the reference voltage (VLr) is set as the new minimum loss voltage Vloss.

FIG. 15B is an example of the correction process when the total loss change amount ΔPall calculated at step S12 exceeds the first threshold Phis, which is a positive value. As shown in FIG. 15B, because the total loss change amount ΔPall exceeds the positive first threshold Phis, a value obtained by the second correction value Vup being added to the minimum loss voltage Vloss during the current processing cycle is set as the new minimum loss voltage Vloss.

Figure 16:
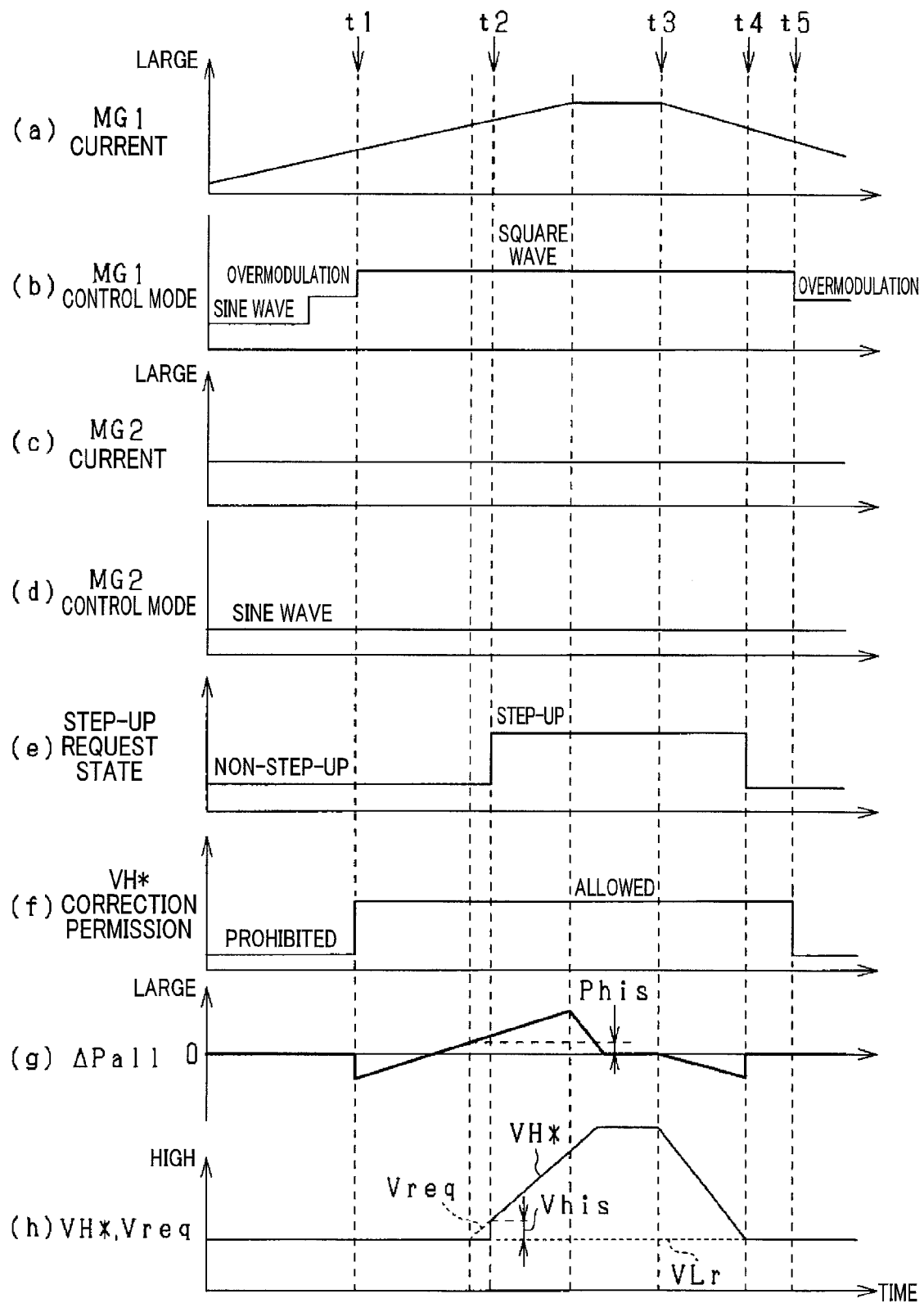
FIG. 16 is a time chart of an example of the method for correcting the voltage command value.

FIG. 16 shows an example of a process for setting the voltage command value VH* according to the present embodiment.

In the example shown in FIG. 16, at time t1, drive control of the motor generator 10a is switched to the square wave control. The control apparatus 40 determines YES at step S10 in FIG. 5. As a result, the process for correcting the voltage command value VH* is allowed. Subsequently, the total loss change amount ΔPall is determined to be a negative value. Therefore, although the minimum loss voltage Vloss is corrected such as to be decreased, in order to decrease the voltage command value VH*, the voltage command value VH* is limited by the battery voltage VLr because the step-up request state is non-step-up mode.

Subsequently, at time t2, the request voltage Vreq is determined to exceed the addition value of the battery voltage VLr and the second threshold Vhis. Therefore, the step-up request state is switched to step-up mode. As a result, the voltage command value VH* starts to increase.

Subsequently, at time t3, the total loss change amount ΔPall becomes a negative value. The minimum loss voltage Vloss starts to decrease, resulting in decrease in the request voltage Vreq. Subsequently, at time t4, the request voltage Vreq becomes less than the battery voltage VLr. Therefore, the step-up request state is switched to non-step-up mode. Subsequently, at time t5, drive control of the first motor generator 10a is switched to the overmodulation control, and correction of the voltage command value VH* is prohibited.

According to the present embodiment described above, the voltage command value VH* is corrected each time during the period in which at least either of the first and second motor generators 10a and 10b is being driven under the square wave control. As a result of this correction method, the operation point of the motor control system at which the total power loss Pall of the motor control system becomes minimum is not required to be ascertained in advance.

Therefore, no consideration is required to be given to the changes in operation point resulting from individual differences among mass-produced motor control systems and the usage environment temperature of the motor control system. Consequently, the total power loss Pall of the motor control system can be accurately reduced even when individual differences among motor control systems and changes in the usage environment temperature of the motor control system are present, while suppressing increase in the number of steps involved in the designing of the control apparatus 40.

According to the present embodiment, a system in which two sets of inverters and motor generators are included is used as the motor control system. In this case, should the operation point of the motor control system at which the total power loss Pall becomes minimum be ascertained in advance, there is concern that the number of steps involved will be large. Therefore, significant advantages are achieved by the above-described method for correcting the voltage command value VH* being applied to a system including two sets of inverters and motor generators.

Detection errors are included in the detection values of the current sensors. The detection error may differ depending on the individual differences among mass-produced motor control systems. In addition, as a result of individual differences, characteristics values of the motor generator may deviate from the characteristics values presumed at the time of designing.

In this case, the map data used to calculate each power loss change amount may differ from the map data presumed at the time of designing Here, according to the present embodiment, focus is placed on only power loss attributed to copper loss, as the first and second loss change amounts ΔPmg1 and ΔPmg2. In addition, the first and second loss change amounts ΔPmg1 and ΔPmg2 are calculated as the difference between power loss attributed to copper loss corresponding to the current voltage command value VH* and power loss attributed to copper loss attributed to a value obtained by the first correction amount Vdown being subtracted from the current voltage command value VH*.

Power loss attributed to copper loss is dependent on current and not dependent on voltage. Therefore, as a result of the first and second loss change amounts ΔPmg1 and ΔPmg2 being calculated as this difference, even when the detection errors of the current sensors vary and the characteristics values of the motor generators differ, effects that the detection errors and deviations in characteristics values have on calculation accuracy of the first and second loss change amounts ΔPmg1 and ΔPmg2 can be suppressed.

Other Embodiments

The above-described embodiment may be modified as follows.

According to the above-described embodiment, a value obtained by the current total power loss Pall being subtracted from the total power loss Pall of the motor control system assuming that the current voltage command value VH* is decreased by the first correction amount Vdown is calculated as the total loss change amount ΔPall. However, the invention is not limited thereto. A value obtained by the current total power loss Pall being subtracted from the total power loss Pall of the motor control system assuming that the current voltage command value VH* is increased by the second correction amount Vup may be calculated as the total loss change amount ΔPall. In this case, for example, the process at step S13 in FIG. 5 may be replaced with a process for determining whether or not the total loss change amount ΔPall is a positive value. In addition, the process at step S15 in FIG. 5 may be replaced with a process for determining whether or not the total loss change amount ΔPall is less than a predetermined negative threshold value.

The total loss change amount ΔPall may include a power loss change amount other than the respective power loss change amounts of the step-up converter 30, the inverters 20a and 20b, and the motor generators 10a and 10b. An example of the power loss change amount is a power loss change amount of the battery 33 when current flows to the battery 33.

According to the above-described embodiment, the motor control system includes two sets of inverters and motor generators. However, the invention is not limited thereto. The motor control system may include three or more sets of inverters and motor generators. In addition, the motor control system is not limited to that which includes a plurality of sets of inverters and motor generators. The motor control system may include a single inverter and a single motor.

What is claimed is:

1. A control apparatus for a motor control system, the motor control system comprising:
    a converter that steps up an output voltage of a direct-current power supply, the converter outputting a stepped-up output voltage;
    an inverter that includes a serially connected member composed of an upper-arm switch and a lower-arm switch, the inverter converting the output voltage of the converter to an alternating-current voltage; and
    a motor driven by the alternating-current voltage outputted from the inverter,
    the control apparatus comprising:
        a command value setting unit that sets an output voltage command value of the converter;
        a converter control unit that controls the converter such that the output voltage of the converter is the output voltage command value set by the command value setting unit;
        an inverter control unit that selects and performs pulse width modulation control when a modulation factor of the output voltage of the inverter is less than a prescribed value, and selects and performs square wave control when the modulation factor is the prescribed value or greater,
            the pulse width modulation control controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor,
            the square wave control controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor;
        a change amount calculating unit that calculates a total loss change amount that is a power loss change amount of the motor control system including respective power loss change amounts of the converter, the inverter, and the motor assuming that a current output voltage command value is changed by a predetermined value; and
        a correcting unit that
            performs a process for performing correction to decrease the current output voltage command value when the current output voltage command value is determined to be greater than the output voltage of the converter at which total power loss change amount becomes minimum, based on the total loss change amount calculated by the change amount calculating unit, during a correction-allowed period that is a period during which the square wave control is performed, and
            performs a process for performing correction to increase the current output voltage command value when the current output voltage command value is determined to be less than the output voltage of the converter at which actual total power loss change amount becomes minimum, based on the total loss change amount calculated by the change amount calculating unit, during the correction-allowed period.

2. The control apparatus for a motor control system according to claim 1, wherein:
    the motor control system includes, as the inverter and the motor, a plurality of inverters and a plurality of motors;
    the converter outputs a voltage to each of the plurality of inverters;
    the change amount calculating unit calculates a total value of respective power loss change amounts of the plurality of inverters and the plurality of motors, as respective power loss change amounts of the inverter and the motor used in calculation of the total loss change amount; and
    the correction-allowed period is a period during which the square wave control is performed on at least one of the plurality of inverters.

3. The control apparatus for a motor control system according to claim 2, wherein:
    the change amount calculating unit calculates, as the total loss change amount, a value obtained by subtracting the current total power loss from a total power loss of the motor control system including respective power losses in the converter, the inverter, and the motor assuming that the current output voltage command value is a value obtained by subtracting the predetermined value from the current output voltage command value; and
    the correcting unit determines that the current output voltage command value is greater than an output voltage of the converter at which the actual total loss change amount becomes minimum based on a determination that the total loss change amount calculated by the change amount calculating unit is a negative value, and determines that the current output voltage command value is less than an output voltage of the converter at which the actual total loss change amount becomes minimum based on a determination that the total loss change amount is a positive value.

4. The control apparatus for a motor control system according to claim 3, wherein:
    the change amount calculating unit calculates the power loss change amount of the inverter to be zero and calculates a power loss change amount attributed to copper loss in the motor as the power loss change amount of the motor when the square wave control is being performed.

5. The control apparatus for a motor control system according to claim 4, wherein:
the change amount calculating unit calculates a power loss change amount attributed to iron loss in the motor as the power loss change amount of the motor when the pulse width modulation control is being performed.

6. The control apparatus for a motor control system according to claim 5, wherein:
the change amount calculating unit calculates, as the total loss change amount, a total value of the respective power loss change amounts of the converter, the inverter, and the motor assuming that the current output voltage command value is changed by the predetermined value.

7. The control apparatus for a motor control system according to claim 6, wherein:
the pulse width modulation control includes
sine-wave pulse width modulation control in which the inverter is controlled such that each phase voltage applied from the inverter to the motor becomes a pulse width modulation waveform voltage based on the output voltage of the converter, and
overmodulation control in which the inverter is controlled such that each phase voltage applied from the inverter to the motor becomes a pulse width modulation waveform voltage having a higher modulation factor than the pulse width modulation waveform voltage in the sine-wave pulse width modulation control;
the prescribed value is a second prescribed value; and
the inverter control unit selects and performs the sine-wave pulse width modulation control when the modulation factor is less than a first prescribed value that is less than the second prescribed value, selects and performs the overmodulation control when the modulation factor is greater than the first prescribed value and less than the second prescribed value, and selects and performs the square wave control when the modulation factor is the second prescribed value or greater.

8. The control apparatus for a motor control system according to claim 1, wherein:
the change amount calculating unit calculates, as the total loss change amount, a value obtained by subtracting the current total power loss from a total power loss of the motor control system including respective power losses in the converter, the inverter, and the motor assuming that the current output voltage command value is a value obtained by subtracting the predetermined value from the current output voltage command value; and
the correcting unit determines that the current output voltage command value is greater than an output voltage of the converter at which the actual total loss change amount becomes minimum based on a determination that the total loss change amount calculated by the change amount calculating unit is a negative value, and determines that the current output voltage command value is less than an output voltage of the converter at which the actual total loss change amount becomes minimum based on a determination that the total loss change amount is a positive value.

9. The control apparatus for a motor control system according to claim 1, wherein:
the change amount calculating unit calculates the power loss change amount of the inverter to be zero and calculates a power loss change amount attributed to copper loss in the motor as the power loss change amount of the motor when the square wave control is being performed.

10. The control apparatus for a motor control system according to claim 1, wherein:
the change amount calculating unit calculates a power loss change amount attributed to iron loss in the motor as the power loss change amount of the motor when the pulse width modulation control is being performed.

11. The control apparatus for a motor control system according to claim 1, wherein:
the change amount calculating unit calculates, as the total loss change amount, a total value of the respective power loss change amounts of the converter, the inverter, and the motor assuming that the current output voltage command value is changed by the predetermined value.

12. The control apparatus for a motor control system according to claim 1, wherein:
the pulse width modulation control includes
sine-wave pulse width modulation control in which the inverter is controlled such that each phase voltage applied from the inverter to the motor becomes a pulse width modulation waveform voltage based on the output voltage of the converter, and
overmodulation control in which the inverter is controlled such that each phase voltage applied from the inverter to the motor becomes a pulse width modulation waveform voltage having a higher modulation factor than the pulse width modulation waveform voltage in the sine-wave pulse width modulation control;
the prescribed value is a second prescribed value; and
the inverter control unit selects and performs the sine-wave pulse width modulation control when the modulation factor is less than a first prescribed value that is less than the second prescribed value, selects and performs the overmodulation control when the modulation factor is greater than the first prescribed value and less than the second prescribed value, and selects and performs the square wave control when the modulation factor is the second prescribed value or greater.

13. A motor control system comprising:
a converter that is configured to be capable of stepping up an output voltage of a direct-current power supply, the converter outputting a stepped-up output voltage;
an inverter that includes a serially connected member composed of an upper-arm switch and a lower-arm switch, the inverter being configured to be capable of converting the output voltage of the converter to an alternating-current voltage;
a motor that is configured to be capable of being driven by the alternating-current voltage outputted from the inverter; and
a control apparatus,
the control apparatus comprising:
a command value setting unit that sets an output voltage command value of the converter;
a converter control unit that controls the converter such that the output voltage of the converter is the output voltage command value set by the command value setting unit;
an inverter control unit that selects and performs pulse width modulation control when a modulation factor of the output voltage of the inverter is less than a prescribed value, and selects and performs square wave control when the modulation factor is the prescribed value or greater, the pulse width modulation control controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor, the square wave control controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor;

a change amount calculating unit that calculates a total loss change amount that is a power loss change amount of the motor control system including respective power loss change amounts of the converter, the inverter, and the motor assuming that a current output voltage command value is changed by a predetermined value; and a correcting unit that
performs a process for performing correction to decrease the current output voltage command value when the current output voltage command value is determined to be greater than the output voltage of the converter at which actual total power loss change amount becomes minimum, based on the total loss change amount calculated by the change amount calculating unit, during a correction-allowed period that is a period during which the square wave control is performed, and performs a process for performing correction to increase the current output voltage command value when the current output voltage command value is determined to be less than the output voltage of the converter at which total power loss change amount becomes minimum, based on the total loss change amount calculated by the change amount calculating unit, during the correction-allowed period.

14. A control method for a motor control system, the motor control system comprising: a converter that steps up an output voltage of a direct-current power supply, the converter outputting a stepped-up output voltage; an inverter that includes a serially connected member composed of an upper-arm switch and a lower-arm switch, the inverter converting the output voltage of the converter to an alternating-current voltage; a motor driven by the alternating-current voltage outputted from the inverter; and a control apparatus, the control method comprising:

setting, by the control apparatus, an output voltage command value of the converter;

controlling, by the control apparatus, the converter such that the output voltage of the converter is the output voltage command value set by the command value setting unit;

selecting and performing pulse width modulation control when a modulation factor of the output voltage of the inverter is less than a prescribed value, and selecting and performing square wave control when the modulation factor is the prescribed value or greater, the pulse width modulation controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor, the square wave control controlling the inverter such that a state in which the upper-arm switch is turned on and the lower-arm switch is turned off and a state in which the upper-arm switch is turned off and the lower-arm switch is turned on are performed, once each, during a single electrical angle cycle of the motor;

calculating, by the control apparatus, a total loss change amount that is a power loss change amount of the motor control system including respective power loss change amounts of the converter, the inverter, and the motor assuming that a current output voltage command value is changed by a predetermined value;

performing, by the control apparatus, a process for performing correction to decrease the current output voltage command value when the current output voltage command value is determined to be greater than the output voltage of the converter at which actual total power loss change amount becomes minimum, based on the total loss change amount calculated by the change amount calculating unit, during a correction-allowed period that is a period during which the square wave control is performed; and performing, by the control apparatus, a process for performing correction to increase the current output voltage command value when the current output voltage command value is determined to be less than the output voltage of the converter at which actual total power loss change amount becomes minimum, based on the total loss change amount calculated by the change amount calculating unit, during the correction-allowed period.

* * * * *